United States Patent

[11] 3,587,302

| [72] | Inventor | Rodney Ta-Chuan Wu<br>Morristown, N.J. |
|------|----------|---|
| [21] | Appl. No. | 800,587 |
| [22] | Filed | Feb. 19, 1969 |
| [45] | Patented | June 28, 1971 |
| [73] | Assignee | Texas-U.S. Chemical Company,<br>Parsippany, N.J. |

[54] APPARATUS AND METHOD FOR TESTING ELASTOMERIC COMPOSITIONS FOR THEIR CRACK RESISTANCE
6 Claims, 10 Drawing Figs.

| [52] | U.S. Cl. | 73/100, 73/15.6 |
|------|----------|---|
| [51] | Int. Cl. | G01n 3/54 |
| [50] | Field of Search | 73/100, 15.6, 96 |

[56] References Cited
UNITED STATES PATENTS

| 2,611,264 | 9/1952 | Keshian | 73/15.6 |
| 2,764,889 | 10/1956 | Hughest et al. | 73/100X |

*Primary Examiner*—Jerry W. Myracle
*Attorney*—Delmar L. Sroufe

ABSTRACT: A flex testing machine for elastomeric compositions provides for the simultaneous testing of a large number of individual samples in a unit, by subjecting them to a number of pure flex stresses, the specimens under test all being mounted on the circumference of a specimen carrier rotated at a controlled but variable rate of speed for a predetermined period of time or number of revolutions, thereby subjecting each of the specimens to a predetermined number of flexes by causing it to contact in each revolution at least one deflector bar, at which the contact is of a nature which induces pure flex in the specimens, all this being conducted under controlled but variable conditions of temperature and atmosphere within the machine and in a measured number of cycles.

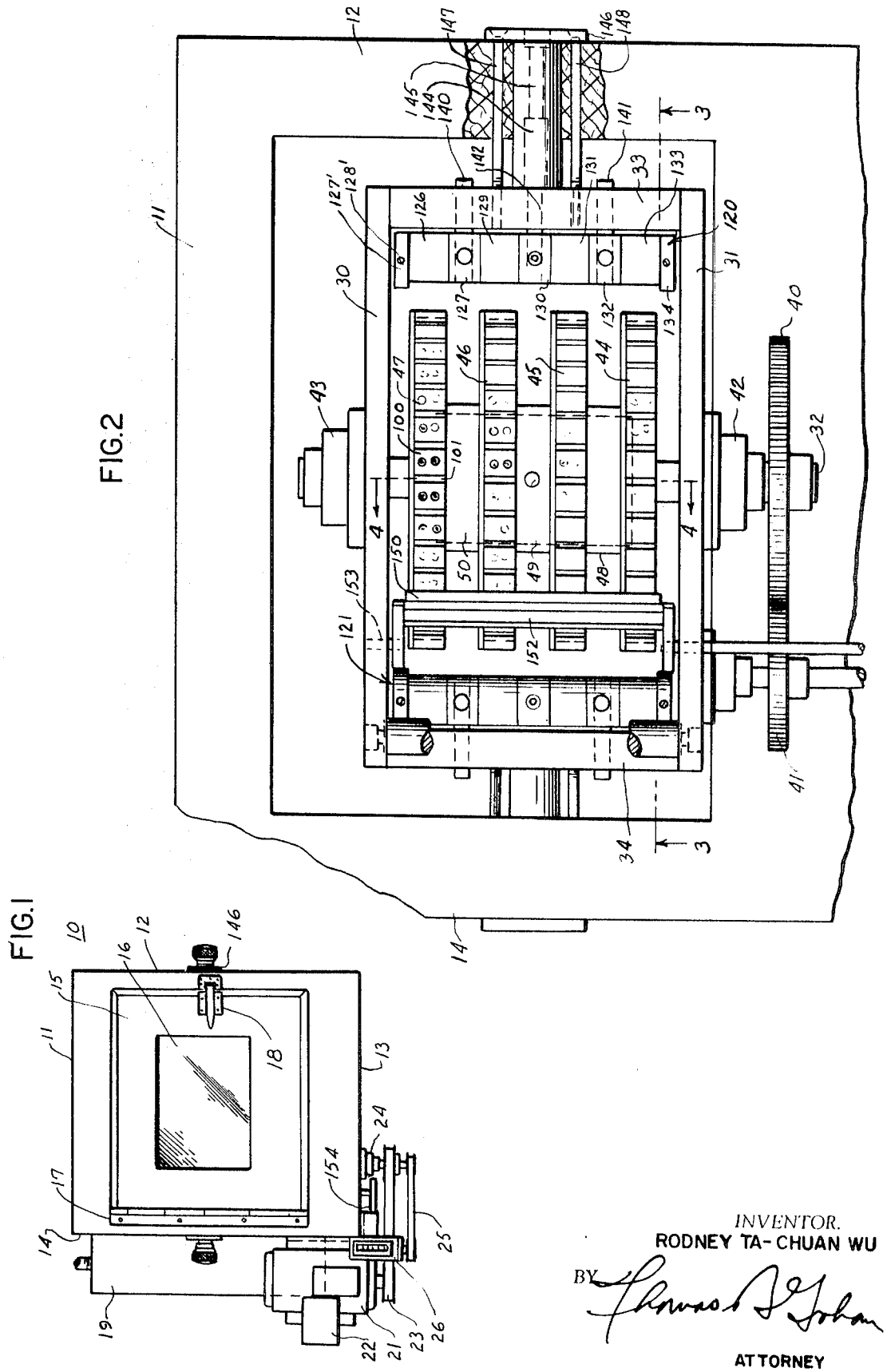

INVENTOR.
RODNEY TA-CHUAN WU

BY Thomas B. Graham
ATTORNEY

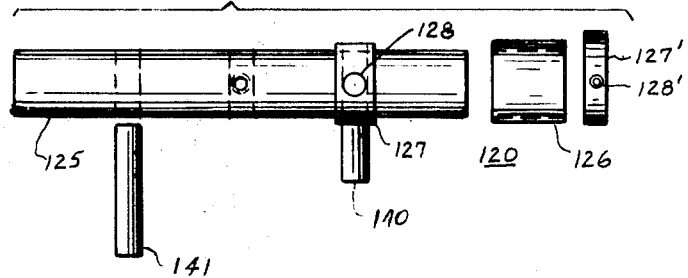
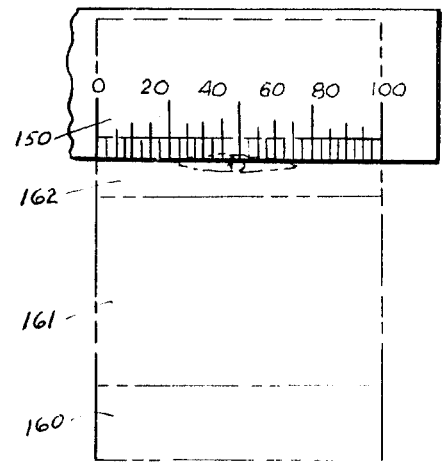
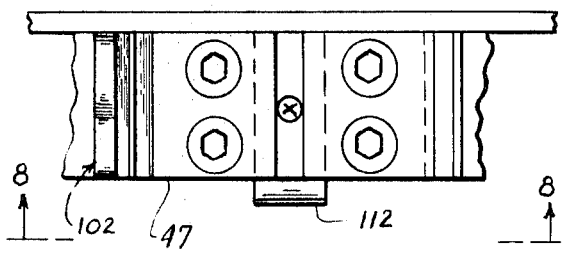
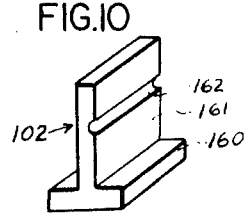
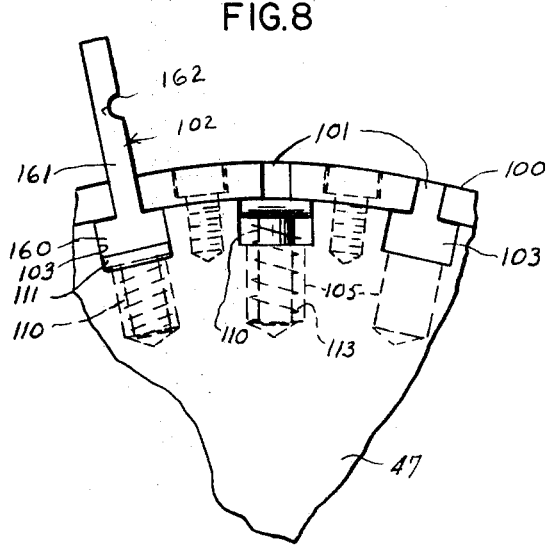
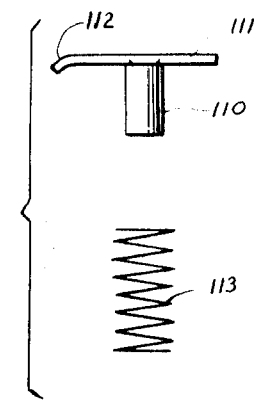
INVENTOR.
RODNEY TA-CHUAN WU
ATTORNEY

APPARATUS AND METHOD FOR TESTING ELASTOMERIC COMPOSITIONS FOR THEIR CRACK RESISTANCE

BACKGROUND OF THE INVENTION

In the manufacture of elastomeric products, particularly compositions useful for fabricating tires for motor vehicles but also compositions of the general family of rubber articles useful in all kinds of applications, an important property of the material which must be known before the composition is used in fabrication is its resistance to flex cracking. This property is critical. Rubber tires, or rubber belts, or other rubber products are subjected in many situations to flexing, varying in degree of severity according to the end use of the product which leads to buildup of internal heat in the composition and eventually to spontaneous cracking and the propagation of any crack which, by whatever mechanism, develops in the composition. That is, poor dispersion of compounding ingredients, gelation, or foreign bodies, can initiate cracking and be the source of a severe crack when the material is subjected to flexing. It is important in the development of such compositions to be able to determine their resistance to flex cracking and also to be able to relate that resistance, whatever its degree, to performance under load conditions. Hence, to be able to develop such compositions, it is important that a test machine be available to provide standardized and particularly reproducible forms of flexing whose rate and magnitude are representative of the load stresses encountered in ordinary use.

It is a fundamental object of this invention to provide an apparatus and method of testing elastomeric compositions under stress of measured predetermined variable amount, such that the stress can be related to performance conditions.

It is another object of the invention to provide a flex testing machine suitable for use with a large number of specimens so that a variety of compositions can be tested simultaneously, under exactly identical conditions, or as nearly the same conditions as a single machine can make possible.

Other objects and advantages of the invention will in part be obvious and in part appear hereinafter.

DETAILED DESCRIPTION OF THE INVENTION

The apparatus of the invention may be described relatively briefly by indicating that it is, in combination, a cabinet within which a controlled but variable temperature and atmosphere can be maintained; and within which there is mounted an axle with specimen carrying discs subject to controlled rotation present thereon; speed indication and revolution counting mechanisms are provided; and adjustably within the contact radius of the wheel carrying the rubber specimens is one or more adjustable deflector bars placed so that they can intercept the radially outstanding elastomeric specimens of the test machine, the bar, being equipped with bearings on a frictionless mount, so that the contact of a rubber specimen with the bar produces no significant abrasive sliding engagement, i.e. no pulling or elongation of the specimen, but rather a mutual frictionless roll and a pure flexing of the test specimen; the machine also housing a scale adjustable to position to measure the extent of growth of a crack in a specimen; the machine, of course, being subject to stop at any point at any time to permit inspection and measurements; and the machine cabinet being provided with a sight window for visual observation, insulation and appropriate electrical control circuitry to permit control over the speed of the driving motor as well as the time of test and/or the number of revolutions it is desired to develop in any particular test.

The invention accordingly, consists of the machine and the elements and combination of elements embodied therein as related to the method of testing elastomeric compositions and the steps and combination of steps thereof all as more fully described hereinafter in the following detailed description of the machine.

THE DRAWINGS

Figure 3:
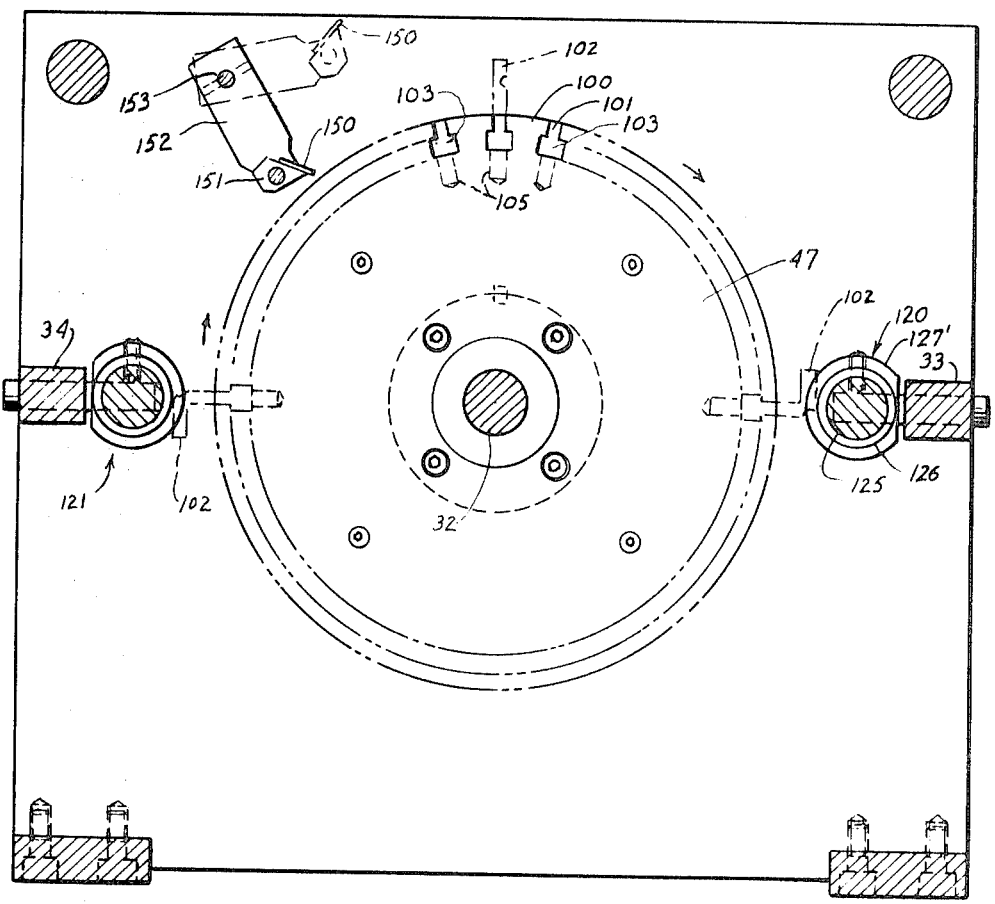
Figure 4:
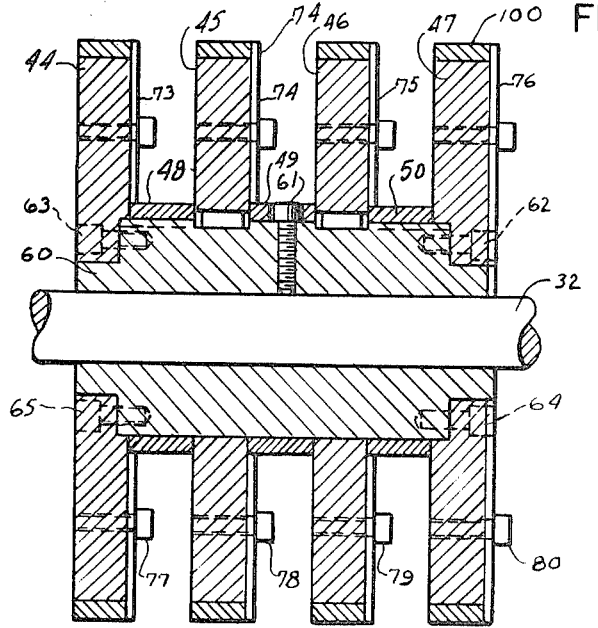

In the drawings:
FIG. 1 is an overall plan view of the machine;
FIG. 2 is taken in horizontal section to show the internal relationship of the parts thereof;
FIG. 3 is vertical section side view of the working testing mechanical portion of the testing disc, including a pair of test specimens carried on the disc, deflector bars, and axle;
FIG. 4 is a vertical section front view through the longitudinal axis of the machine showing the relationship among specimen discs;
FIG. 5 is a detailed showing of the construction of a deflector bar and how its parts are precisely set in place;
FIG. 6 is a detail of the measuring unit;
FIG. 7 is a plan view showing details of specimen mounting slots in a test disc;
FIG. 8 is the corresponding side elevation;
FIG. 9 shows a detail of a specimen retainer;
FIG. 10 shows a specimen in perspective.

Referring now to FIG. 1, 10 represents the machine consisting of a generally cubical box having sides 11, 12, 13 and 14. The top of the box is closed by door 15 having viewing window 16, the door being hinged at 17 and latched at 18. The purpose of this is to provide a closed container for conducting the test, within which it is possible to maintain a controlled atmosphere with regard to temperature and composition and also to view the specimens under test and, while they are stopped actually to choose a particular specimen for a measurement.

Air and heat control as well as electrical power are connected to the device through the units shown generally at 19. The particular device for heating the air in the test box may be varied to suit the convenience of the operator. The remainder of the mechanism shown in FIG. 1 consists of a variable speed drive motor 21, starting controls 22, belt connection 23, with an appropriate reducer 24 for driving the machine through the axle carrying the test discs within the mechanism. Belt 25 is connected to the counter or tachometer 26, so that the total test including the number of revolutions, time, atmospheric condition and composition etc. can be kept under control.

In FIG. 2 there are further details of the construction and it will be seen that the sides of the box are insulated to provide or to assist in the appropriate temperature control and that within the test container itself the machine consists of a frame, namely, supports 30 and 31 for carrying the horizontal axle 32 of the machine and end supports 33 and 34 for carrying the deflector bar mechanism and micrometer adjustments. The axle 32 which carries the test discs is connected by gear 40 to reducer 41 and through bearings 42 and 43 and appropriate housings to carry test discs 44, 45, 46 and 47 locked on the axle with spacers 48, 49 and 50. This is the mechanical structure by which the group of spaced test discs is carried within the framework within the machine. Additional details of the discs are shown in FIGS. 3 and 4 and details of the specimen mount are shown in FIGS. 7, 8 and 9.

It will be observed from FIG. 2 that the discs consist of units which are individually locked in place by any appropriate detent and setscrew mechanism on the shaft 32.

Details of the mounting of discs and a form of structure for them can be seen in FIG. 4, where the shaft 32 is shown and the section is taken along line 4—4 as indicated in FIG. 2. The shaft 32 carries a large collar 60 carrying two central discs 45 and 46 locked in place on either side of second collar 49 by setscrew 61. Spaced from the center collar are two additional collars 48 and 50 which serve to space the additional discs 44 and 47. These are locked in place by setscrews 62, 63, 64 and 65. Completion of the details of the structure of the discs involves providing each with a side face extending to the external circumference as shown at 73, 74, 75 and 76. The side plates are held in place by appropriate detent screws 77, 78, 79 and 80. Each side plate is held in place by four such screws.

It will be apparent that the precise mechanical arrangement by which the four test discs 44, 45, 46 and 47 are held in place on the shaft is subject to variation. The important aspect of structure is that they be precisely made to match and that they be held firmly in place so that the number of test cycles or rotations of the discs can be counted and that they be spaced accurately. The circumferences are constructed in accordance with the invention so that the specimens can all be held in a standard relationship to the diameter of the shaft.

The latter feature of the construction of the wheel making it neatly adaptable to test purposes is shown in the vertical section of the machine as shown in FIG. 3, where the shaft, test disc, deflector bars, adjustable scale and test specimens are shown in their appropriate geometric relationships to each other.

By reference to FIG. 3, the reasons for the details of construction and the geometric relationship of the several parts of the machine will become apparent. Here the central shaft 32 is shown in connection with the disc 47 shown in full circumference.

The disc is constructed with a shoe 100 defining a sequence of radial slots in the outer circumference thereof. Each segment of the shoe is held in place by setscrews, (FIG. 7) the space 101 between segments being just sufficient to receive a test specimen shown as 102. Immediately beneath the shoe the disc is formed with a slot 103 just large enough to receive the base of a specimen. Beneath the space for the specimen is provided the radial hole 105 in which the spring loaded keeper for the specimen is mounted. Reference to FIG. 9 will show the details thereof, wherein the keeper 110 has an extended flattened top 111 with a thumb grip end 112 extending therefrom. Spring 113 is shown in exploded relationship to the keeper.

Reference to FIG. 8 will show the disc 47 in partial section and keeper 110 in place with spring 113 holding it. Specimen 102 is shown being held in place by the keeper 110. The mechanism for so doing can be fully understood by reference to FIG. 7 where the thumb extension 112 is visible at one side of the wheel 47. It will be apparent that it can be depressed and that the specimen thereafter fits easily into the slot in the disc and under the two shoe segments adjacent to the slot. It is retained in its slot by the pressure of the released spring 113.

The structure is repeated around the entire circumference of the disc and on each of the four discs to provide for carrying a large number of specimens through a test in a given interval of time. At opposite ends of a diameter, and this can be any number of diameters in the machine, but for convenience in the present machine as shown in FIG. 2, it is at opposite ends of the horizontal diameter, there are mounted the deflector bars 120 and 121. Each deflector bar as shown in FIG. 5 consists of a circular shaft 125 carrying thereon frictionless bearing mounted collar 126 held in place by spacer 127 and setscrew 128. End spacer 127' and setscrew 128' complete the bar. This structure is repeated on the deflector bar as many times as there are discs on the shaft 32, and as seen in FIG. 2 the bar carries four sleeves or collars, 126, 129, 131 and 133. Spacers 127, 130, 132 and end collar 134 complete the assembly. Spacers are, of course, held fixed by setscrews. Micrometric adjustment of the deflector bar toward and away from the circumference of the test discs can be accomplished by the mechanism shown in FIG. 2 where the deflector bar 120 is shown in direct circumferential relationship to the discs 44, 45, 46 and 47. Between collars in position corresponding to slots between test discs are guide rods 140 and 141 which hold the deflector bar horizontal and provide for radial sliding directly toward and away from the longitudinal axis of the shaft 32, that is, the deflector bar is held parallel to the longitudinal axis of the machine. Micrometer adjustment along guideline or guide bar 142 is made by means of the micrometer connections 144, 145, 146, 147 and 148. Here again the detail of the connection of micrometer through the side of the machine is not important, but the principle is that an externally guided and readable micrometer screw be available with mechanical engagements inside the box to the deflector bar, to adjust the bar inwardly and outwardly along a line radial to the axis of the test discs, so that the bar is held in proper relationship to the discs carrying the test specimens. Connection here is by bar 142, 144, 145 and 146 to a micrometer dial head as shown in FIG. 1. This is duplicated at the diametrically opposite side of the machine, if it is desired.

Referring to FIG. 3 the test specimen 102 as shown in place is vertical; and one quadrant displaced therefrom a test specimen in striking position against the bar as seen. An important element of the bar structure is that the collar which the specimens strike be on a frictionless bearing and offer no abrasive resistance to the specimen as it passes through that quadrant, or the striking position. In this manner, pulling, twisting or elongating of the specimens is avoided and as a result they are subjected to a pure flexing action.

The structure shown in FIG. 3 also contains a measuring scale 150, mounted on support 151, carried by arm 152 pivoted at 153. An external handle 154 makes it possible to tilt the unit to the position shown thereby placing it in a measuring position adjacent to the revolving samples. The dotted lines represent the position of the measuring scale when said scale is not in use. This measuring device is used when a test is interrupted to take measurements of crack propagation in test specimens without interfering with the atmospheric conditions inside the closed box.

A typical test specimen is shown in FIG. 10. It is molded of the rubber to be tested and consists of base 160, extension 161, having molded in it a groove 162. For test purposes it is pricked to a standard width and depth in the middle of the groove and the rate of propagation of the crack from this start is measured. For purposes of this invention, the hole which is pricked in the center of the groove is 0.08 inches in width. It should be noted, however, that the dimension of this hole may be varied as long as the practitioner makes comparable adjustment in the criteria which are used to indicate failure of the test sample. Furthermore, it should be noted that the novel apparatus of this invention need not be utilized in conjunction with the novel flex testing process disclosed herein, i.e. the process using a test sample which contains a prick mark and directing the flexing means at the sample so as to insure that the prick mark is on the line of flex of the sample.

The novel apparatus of this invention may be utilized to determine the flex characteristics of an elastomeric material on either an absolute or a comparative basis. Thus, an absolute flex value may be obtained merely by noting the number of flexes required in order for the specimen to reach the point of failure. It has been ascertained that the point of failure is reached when a ten-fold increase in the width of the original prick mark is noted, i.e. an increase in width from 0.08 to 0.8 inches. The flex performance of a test specimen may also be determined on a comparative basis merely by inserting a control sample in the flex apparatus along with the test specimen, subjecting both specimens to identical flexing conditions, and noting the flex performance of the test specimen in relation to that of the control.

Test procedure: Specimens are formed of rubbers to be tested. Each specimen is pricked so as to form a hole having a 0.08 inch width and a 0.092 inch depth. The specimens are then mounted in place on the discs. Of course, positions of specimens can be identified by any convenient code. The interior of the box 10 is brought to temperature and properly humidified air circulated through it for the duration of the test. By speed controls and counter it is possible to carry the test to any number of revolutions and with two flexes per specimen occurring in each revolution, it is evident it can be reduced to a specified number of flexes. The machine can be stopped at any time and the discs manually brought (by turning the belt drive) to any position to measure the crack propagation in a specimen. In FIG. 6 an enlarged diagram shows how the scale 150 is brought to the face of a specimen, at precisely the line of formation of the crack. Measurements can be noted as often as is desired. Since the machine has a window top and can be provided with internal illumination it is possible to make the measurements without opening the machine and thus interrupting the temperature control.

It will be seen that with the structure, as shown a single disc can carry 30 specimens and that the four discs thus can carry a maximum of 120 specimens and that with a test conducted with all these specimens under the same conditions of temperature, atmospheric composition and frequency of flex, a statistically valid reading of the resistance of the composition being tested to flex cracking can be had.

I claim:

1. In an apparatus for the flex testing of elastomeric materials comprising a closed container with means for controlling the temperature and composition of the atmosphere therein, the improvement in a testing combination therein comprising a shaft generally centrally located and passing through said container from side to side, said shaft being mounted in bearings and equipped with a drive so that it can be rotated at a controlled rate of speed for a controlled number of revolutions, said shaft carrying at least one test disc thereon, said disc having provision around its periphery for carrying a plurality of test specimens, at least one deflector bar mounted in said container parallel to said disc-carrying shaft, movable mounting means for said deflector bar for moving said bar radially toward and away from the periphery of said specimen-carrying disc to engage test specimens thereon and cause flexing thereof, said deflector bar at the point of contact with said test specimens carrying a collar mounted thereon in a virtually frictionless engagement relative to said bar, so that test specimens engaging said bar are subjected to pure flex.

2. In a test machine as defined in claim 1, wherein said specimen-carrying disc has radial slots along the circumference thereof each slot being suitable to receive a portion of a test specimen to retain it in fixed position for subsequent testing, and a mounting means for each said specimen comprising segments of a shoe affixed peripherally to said disc with a radial slot between adjacent segments and a radially movable internal spring loaded pressure member engageable from the side of said disc to retract it from said shoe for insertion of said portion of a test specimen through said slot and between said member and adjacent shoe segments, which member exerts pressure against said portion of said specimen to hold it in place.

3. In a test machine in accordance with claim 1 wherein said deflector bar for engaging the specimens being subjected to the flexing test comprises a cylindrical bar carried parallel to the axis of said disc-carrying shaft, said bar being movable in said parallel relation to the axis inwardly and outwardly along a radius of said test disc, the further improvement comprising a machine support member having guide openings therein, a support member for said bar comprising guide openings in said machine support member, a guide bar affixed to said deflector bar and a calibrated drive engaging said guide bar, the specimen striking portions of said bar being bearing mounted collars on said bar providing pure flex engagement with test specimens.

4. In a test machine in accordance with claim 1, means for measuring the crack propagation in the specimens being subjected to the flexing test without altering the atmospheric conditions inside said test machine, said means comprising a handle member outside said container, a pivoted arm extending through said container and connected to said external handle, a support means carried on said pivoted arm and a linear scale mounted thereon, said measuring means being movable toward and away from the periphery of said specimen containing disc so as to be positioned adjacent to the line of formation of the crack during said measuring operation and positioned away from the path of rotation of said specimen carrying disc during the flexing operation.

5. A method for determining the flex resistance of an elastomeric material which comprises forming the elastomeric material into a test specimen having a groove along the width thereof containing at its center a prick mark of known dimensions; flexing said test specimen along a horizontal line which passes through said prick mark by contacting said test specimen with a flexing means which provides pure flex engagement; continuing said flexing for a time period sufficient to effect a ten-fold increase in the width of said prick mark; and noting the number of flexes to which said specimen has been subjected during said time period.

6. The method of claim 5, wherein said flexing means is a cylindrical bar having affixed thereto bearing mounted collars which function as the specimen striking portion of said bar providing pure flex engagement with said test specimen.